June 3, 1952     M. S. SNELL     2,598,847
INSTRUMENT TYPE SWITCH
Filed March 24, 1945

Inventor
Maurice Saxon Snell
By Braun Jackson Boettcher Dienner
Attys.

Patented June 3, 1952

2,598,847

UNITED STATES PATENT OFFICE 2,598,847

INSTRUMENT TYPE SWITCH

Maurice Saxon Snell, Enfield, England, assignor to Sangamo Electric Company, Springfield, Ill., a corporation of Illinois Application March 24, 1945, Serial No. 584,533
In Great Britain April 21, 1944

6 Claims. (Cl. 200—56)

The present invention concerns improvements in or relating to instrument type relays of the kind in which the contact is made effective and reliable by magnetic attraction.

In my prior British Patent No. 548,712 I have described an instrument type relay in which a small permanent magnet mounted on the pointer co-operates with a fixed soft iron member so that when the pointer reaches a certain position the attractive force between the magnet and the soft iron results in contact being made through the magnet and the soft iron. To restore the pointer a current coil wound on the soft iron is excited in such a direction as to cause the soft iron to repel the magnet.

It is an object of the present invention to provide an improved construction of the relay referred to so as to meet a more extended range of conditions which have been found to arise in practice.

According to one feature of the invention a contact blade engages with a bead of contact material on the pointer and nearer to the axis thereof than the magnet so as to improve both the electrical contact and to assist the restoring force.

According to another feature of the invention the pointer is manually restored by a quark spring in which the pressure of a button at one part thereof causes an amplified movement in a direction at right angles thereto to restore the pointer.

According to a third feature of the invention the soft iron and its associated elements, are mounted on a carriage which is adapted to be adjusted along an arc coaxial with the pointer, to enable contact to be made for varying deflections of the pointer.

The invention will be better understood by referring to the accompanying drawings which illustrate one example of carrying the invention into effect although it will be understood that considerable modifications may be made in the constructional details without departing from the spirit of the invention.

Referring to the drawings.

The pointer P may be mounted and constructed as in known arrangements but in addition is fitted at its extremity with a permanent magnet A which is long and narrow and is magnetised along its length serving as an extension of the pointer the end being conveniently pointed to move over the scale and indicate the deflection of the pointer. The pointer is also fitted with a bead G of contact material very much nearer the staff on which the pointer is mounted.

An arcuate member AM fixed to the frame of the instrument and having an arcuate slot AS therein is provided to serve as a support and guide for the moulded carrier C to enable it to move in a circular arc. The carrier C carries a soft iron member B, an exciting coil EC, a contact blade E and contact blade adjusting means F. The soft iron member B is conveniently U-shaped, that is, having two limbs at each end of a crosspiece about which the exciting coil EC is wound, the limbs serve as polepieces and are so spaced that when the pointer P approaches the soft iron member B the limbs face the two opposite poles respectively of the permanent magnet A fixed thereto. The soft iron member B is mounted on a base of non-magnetic material which acts as a carriage and has a toothed arcuate rack by which it is adapted to be moved along the arcuate member and the arcuate slot therein under the control of a pinion wheel D. The adjustment can be made from outside the instrument for instance by a member slotted to take a screw driver and connected to the pinion through a form of friction clutch to prevent excessive strains being communicated to the teeth of the pinion.

The contact E consists of a leaf spring which is supported on the outer limb of the soft iron member B and extends radially inwards having contact material at the end which faces the contact bead on the pointer P.

By this means the pointer P may be made to make contact for any desired deflection over a given range determined by the length of the arcuate slot AS and like considerations.

The operation is such that when the instrument relay is excited appropriately the pointer P comes sufficiently near to the soft iron member B that the magnetic attraction between the permanent magnet A and the soft iron member B comes into play and the pointer is then deflected further under control of this attraction. Before contact is established between the permanent magnet and the stationary elements including the soft iron, the contact bead G engages the contact on the contact blade and the slight additional movement before the pointer comes to rest is sufficient to ensure an appreciable rubbing movement between the contacting points and therefore a clean contact with the added advantage that the contact pressure is amplified.

The moulded carrier C has a screw F threaded therethrough one end of which engages the contact blade so that the position of the contact blade and its contact can be adjusted.

Figure 3:
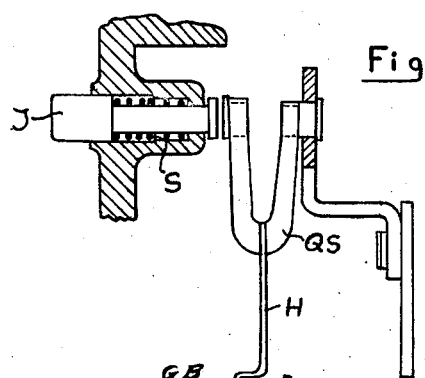
Figure 3 illustrates a quark spring in perspective.

Release may be effected electrically or manually. To release electrically all that is necessary is to energise the exciting coil EC in such a direction as to cause a magnetic field to be generated opposing that of the permanent magnet and the repelling force so generated (which assists the pressure of the contact blade) throws the pointer off. If it is desired to release by a manual operation, this can be achieved according to the present invention by a quark spring QS. A quark spring is a device made of thin springy metal so shaped that pressure in one direction causes amplified movement in a direction at right angles. Such a spring is illustrated in Figure 3 which shows an endless strip of springy metal which is bent in such a way that it forms two almost closed rings having a common axis and having their corresponding open ends joined by loops formed from the strip. The loops extend in a plane substantially radial with respect to the common axis. Pressure on the rings in an axial direction indicated by the arrow $a$ causes arms extending from the outer extremities of the loops to move towards each other in a direction at right angles to the axis. This is due to distortion of the metal and the result is an amplification of the operating movement.

The quark spring QS as illustrated is provided with one or two arms such as H secured to and extending from the apex of one or both loop elements and provided at their ends with glass beads GB. Two arms are used when the instrument pointer is intended to make contact on either side of a neutral point while one arm is used when contact is to be made on one side only.

Figure 2:
Figure 2 illustrates the operation of the quark spring for restoring the pointer manually.

A push button J (Fig. 2) is provided on the front of the instrument. This operates through a gland in the casing of the instrument against the pressure of a spring S to act on one of the coaxial rings of the quark spring, the other ring being fixed to the back of the instrument casing.

Figure 1:
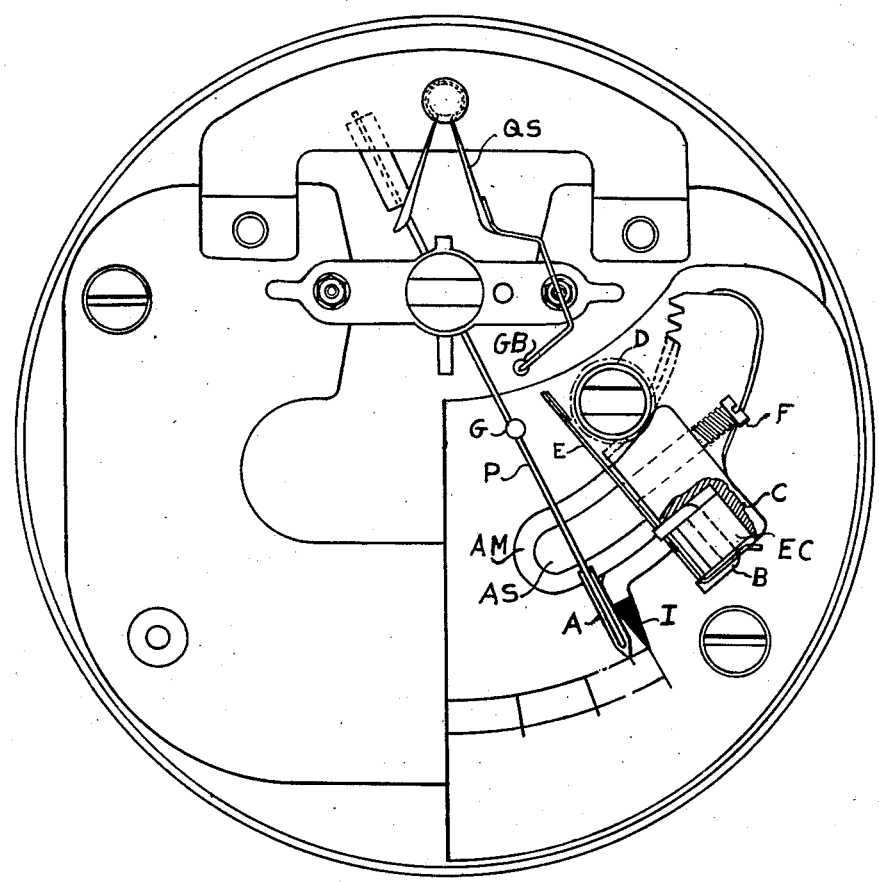
Figure 1 shows an instrument according to the invention in front view.
Figure 1:
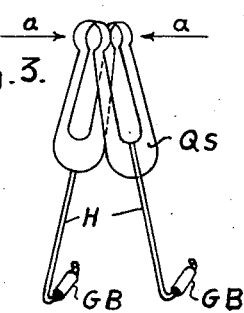

When the push button is pressed to cause the two coaxial rings of the quark spring to come nearer together the arm and glass bead GB move in a clockwise direction as seen in Figure 1 so as to engage the pointer and move it and the magnet A away from the soft iron member B.

When in operation the operating current at which the relay is to operate is determined by setting the carrier C until the index I is opposite the appropriate part of the scale.

This means that when the operating current is of the value for which the relay is set the pointer will have reached such a position that attraction between the permanent magnet A and the soft iron member B will be just enough to ensure that the pointer is caused to move against the normal restoring spring a further distance to ensure that contact bead G makes a contact with the contact material on the end of the contact blade E and deflects the blade to ensure that there is not only sufficient pressure for a reliable contact but also to bring into play a restoring force additional to the restoring force of the normal restoring spring.

It will be appreciated that by means of the invention it is possible to supply instruments having manual release only, electrical release only or both manual and electrical release with substantially the same essential elements of construction.

I claim:

1. An instrument type electrical relay comprising a pivotal pointer, a permanent magnet mounted on said pointer in the form of a straight bar magnet extending lengthwise of the pointer so that the opposite magnetic pole extremities of the magnet lie at different radial distances along the length of the pointer, a stationary U-shaped magnetic member cooperating with said permanent magnet for attracting and holding said pointer when the latter attains a predetermined deflection position, the ends of said U-shaped magnetic member being disposed so that they are magnetically bridged by the pole extremities of said permanent magnet when the pointer is in such deflected position, contact means carried on said pointer at a point nearer to the pivot thereof than said permanent magnet, a cooperating contact carried by a fixed contact blade which is arranged to be held in stressed condition by the engagement of said pointer contact means when the pointer is held by said stationary magnetic member whereby it assists in the restoration of the pointer upon release of the latter, a winding on said stationary magnetic member for energizing the latter in such direction as to cause repulsion of said permanent magnet and carrier means for said stationary magnetic member and said fixed contact blade, said carrier means being adjustably mounted for arcuate movement about the pivotal axis of said pointer for altering the current value at which the relay operates.

2. An instrument type electrical relay comprising a pivotal moving system controlling electric contact means, magnetic holding means comprising a permanent magnet element and a soft-iron element, one element of which means is carried by the moving system and the other element of which is carried by a stationary part of the relay structure, said elements being arranged to be brought into engagement when the relay is sufficiently energized to cause closure of the controlled electric contact means thereof, carrier means for the stationary element of said magnetic holding means, said carrier means being adjustably mounted for arcuate movement about the axis of said pivotal moving system for altering the current value at which the relay operates, a quark spring, means carried by said quark spring for mechanically disengaging said elements of said magnetic holding means when said quark spring is subjected to pressure in the vicinity of its mid-region, and a push-button adapted when operated manually to apply the requisite pressure to said mechanical disengaging movement.

3. An instrument type electrical relay comprising a pivotal pointer, a long and narrow permanent magnet magnetized along its length secured to and forming a lengthwise extension of said pointer so that the opposite pole extremities of said permanent magnet lie at different radial distances along the length of said pointer, an electrical contact mounted on said pointer intermediate said permanent magnet and its pivotal axis, an arcuate slotted member mounted upon the stationary structure of the relay, a carrier element of insulating material secured to said arcuate slotted member and arranged for movement along a circular arc coaxial with the pivotal axis of said pointer, a contact blade spring secured at one end to said carrier element and having a contact thereon at its other end positioned to cooperate with said contact on said pointer, an adjusting screw carried in said carrier element and arranged for engagement with said blade spring intermediate its ends for the purpose of adjusting the position of said contact on said blade spring relative to said carrier element, a U-shaped soft-iron member mounted on said carrier element and positioned so that its two free ends align with the opposite pole extremities of said permanent magnet when the pointer moves into the vicinity thereof so that said permanent magnet is in magnetic bridging relation across the free ends of said soft iron member and a coil winding around an intermediate limb of said U-shaped member for the purpose of polarizing the two free ends of said U-shaped member in similar magnetic sense to that of the cooperating poles of the permanent magnet to cause repulsion of the latter therefrom.

4. In an instrument type electrical relay comprising a movable coil rotatable in a magnetic flux gap, the combination of a permanent magnet and a soft-iron member which are arranged to be brought into engagement when the coil rotates a predetermined angular extent, a quark spring, means carried by said quark spring for mechanically disengaging said magnet and said soft iron member when said quark spring is subjected to pressure in the vicinity of its midregion, and a push-button adapted when operated manually to apply the requisite pressure to said quark spring to effect said mechanical disengaging movement.

5. In an instrument type relay, the combination of a pivoted pointer, a permanent magnet mounted on said pointer, a stationary magnetic member toward which said permanent magnet is adapted to be attracted when in proximity thereto, a movable electrical contact moving with said pointer, a relatively stationary electrical contact adapted to be engaged by said movable contact when said permanent magnet is attracted toward said stationary magnetic member, a quark spring for releasing said pointer from its contact closing position, said quark spring comprising an endless strip of thin springy metal formed with two substantially closed ring portions disposed in substantially aligned axially spaced relation and also formed with two looped portions one at each side of the spring joining the corresponding ends of said ring portions, and a push-button for pressing the coaxial ring portions toward each other whereby to cause relative movement between said loop portions substantially at right angles to the axis of said ring portions, such relative motion between said loop portions serving to release said pointer from its contact closing position.

6. In an instrument type electrical relay wherein a pivotal pointer carries a movable contact adapted to engage a cooperating stationary contact when the pointer attains a predetermined deflection position, and wherein said pointer also carries a movable magnetic member adapted to coact magnetically with a stationary magnetic member when said pointer approaches said latter position, the combination therewith of manually operable restoring means for forcibly separating said magnetic members comprising a quark spring constructed of an endless strip of thin springy metal formed with two substantially closed ring portions disposed in substantially aligned spaced relation and also formed with two loop portions, one at each side of the spring, joining the corresponding ends of said ring portions, a push-button for pressing the coaxial ring portions toward each other whereby to cause relative movement between said loop portions substantially at right angles to the axis of said ring portions, and means for transmitting movement from one of said loop portions to said pointer for restoring the latter.

MAURICE SAXON SNELL.

REFERENCES CITED

The following references are of record in the file of this patent:

UNITED STATES PATENTS

| Number | Name | Date |
| --- | --- | --- |
| 527,092 | Ward | Oct. 9, 1894 |
| 1,246,430 | Hopkins et al. | Nov. 13, 1917 |
| 1,410,120 | Radley | Mar. 21, 1922 |
| 1,594,301 | Heymer | July 27, 1926 |
| 2,014,388 | Lamb | Sept. 17, 1935 |
| 2,099,106 | Ewart | Nov. 16, 1937 |
| 2,249,369 | Williams | July 15, 1941 |

FOREIGN PATENTS

| Number | Country | Date |
| --- | --- | --- |
| 566,048 | Germany | Dec. 9, 1932 |
| 545,757 | Great Britain | June 10, 1942 |
| 548,712 | Great Britain | Oct. 21, 1942 |